C. H. RICHARDSON.
PIPE SQUEEZER.
APPLICATION FILED MAY 29, 1916.
1,223,522.
Patented Apr. 24, 1917.
2 SHEETS—SHEET 1.
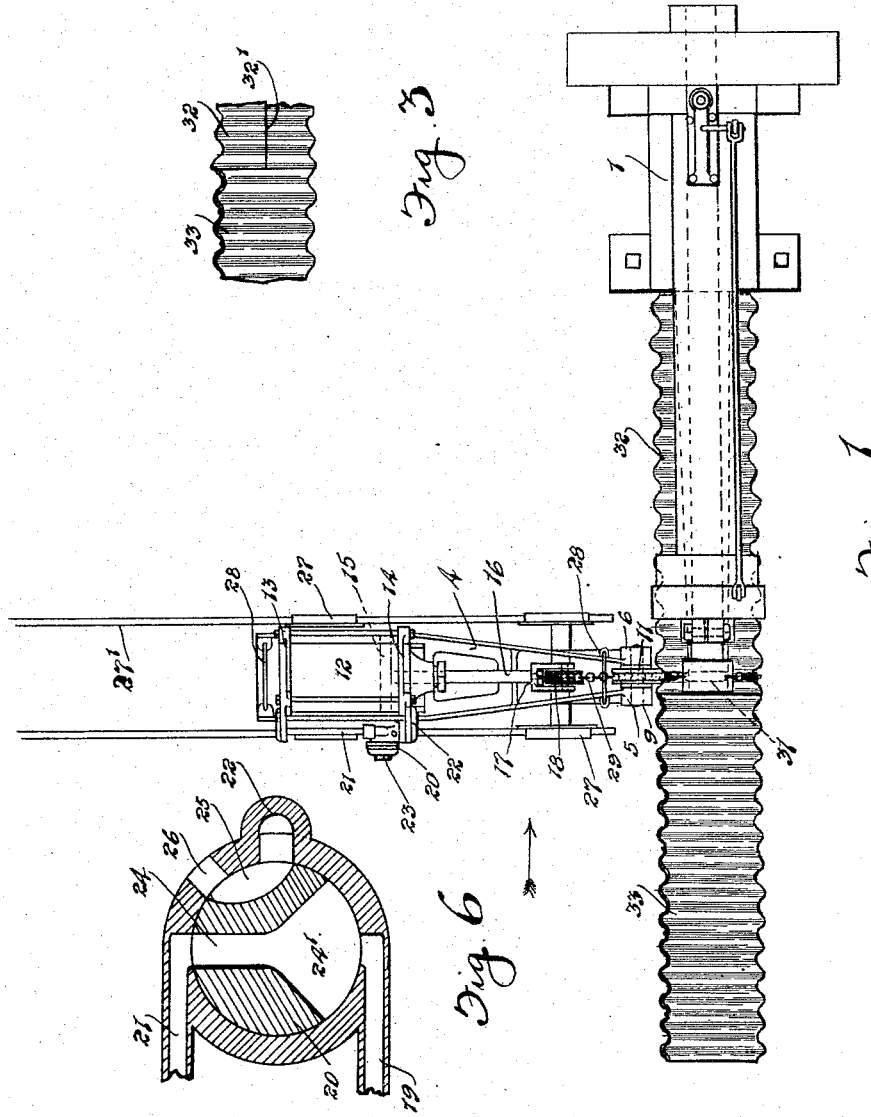
WITNESSES
INVENTOR
C. H. Richardson
By
Attorneys C. H. RICHARDSON.
PIPE SQUEEZER.
APPLICATION FILED MAY 29, 1916.
1,223,522.
Patented Apr. 24, 1917.
2 SHEETS—SHEET 2.
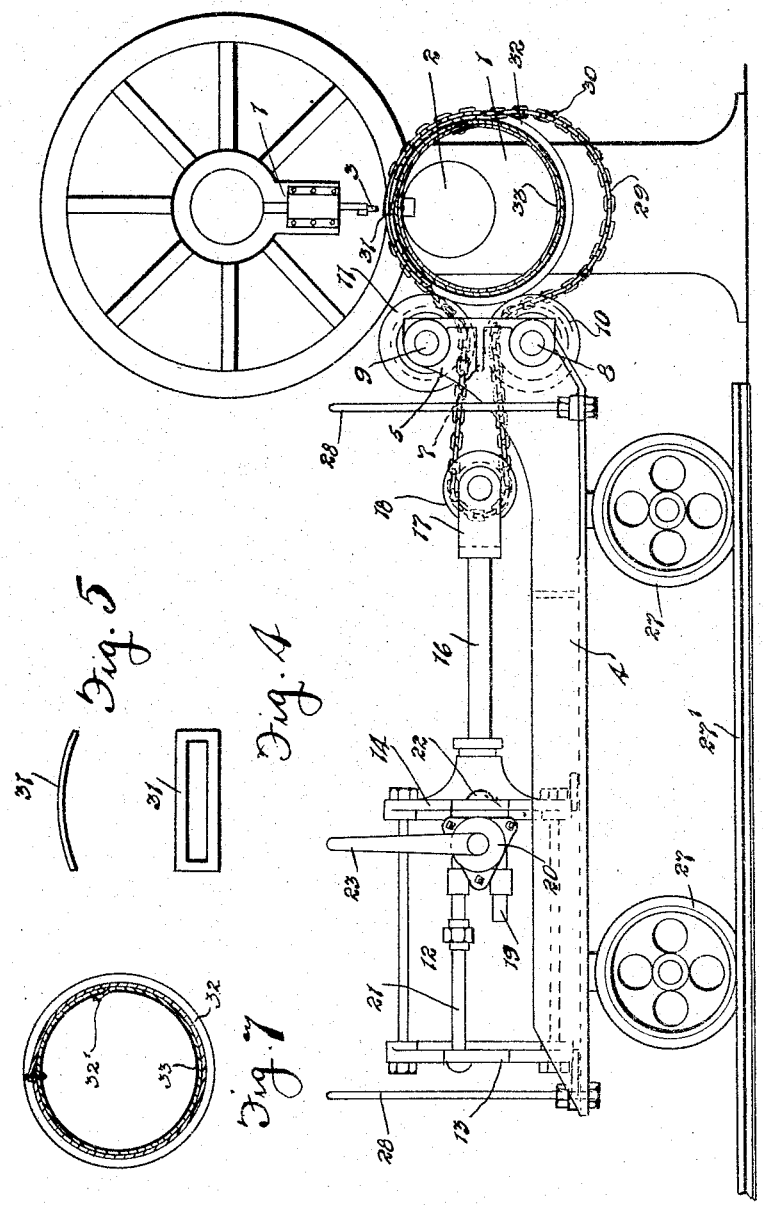
WITNESSES
INVENTOR
C. H. Richardson
By
Attorneys

UNITED STATES PATENT OFFICE.

CECIL HENRY RICHARDSON, OF SASKATOON, SASKATCHEWAN, CANADA.

PIPE-SQUEEZER.

1,223,522. Specification of Letters Patent. Patented Apr. 24, 1917.

Application filed May 29, 1916. Serial No. 100,675.

*To all whom it may concern:*

Be it known that I, CECIL HENRY RICHARDSON, of the city of Saskatoon, in the Province of Saskatchewan, Canada, have invented certain new and useful Improvements in Pipe-Squeezers, of which the following is the specification.

The invention relates to improvements in devices particularly adapted for drawing or squeezing together the overlapped ends of culvert or similar pipes, and the principal object of the invention is to provide a device whereby this work can be expeditiously done and in a manner consistent with shop practice and in such a way that the meeting ends of the pipes can be very tightly drawn together and riveted while held tightly squeezed, and it consists essentially in a continuous chain passed around the ends of the pipes to be squeezed together and fitted with an elongated arched link to facilitate in riveting and a shiftable machine presenting a steam cylinder, piston and piston shaft and having the front end of the piston shaft fitted with a single pulley and the other end of the machine with a pair of opposing pulleys, all the pulleys being contained in the same plane and being adapted to receive the chain which passes between the pair of pulleys and around the single pulley, the parts being arranged and constructed as hereinafter more particularly described and later pointed out in the appended claims, reference being had to the accompanying drawings in which;

Figure 1 represents a plan view of the complete appliance as it appears when set up and in use.

Fig. 2 represents an enlarged side view of the parts as they appear in Fig. 1, and looking in the direction indicated by the arrow.

Fig. 3 is a plan view of the connected ends of the pipes.

Fig. 4 is a plan view of the elongated arched link.

Fig. 5 is a side view of the link.

Fig. 6 is an enlarged detailed vertical sectional view through the cylinder valve.

Fig. 7 is a vertical sectional view through the joint formed between the overlapped ends of the pipes after riveting.

In the drawings like characters of reference indicate corresponding parts in each figure.

In order to better understand this invention I wish to explain primarily that considerable difficulty has been experienced heretofore in properly connecting the ends of overlapped sheet metal pipes in such a manner that a good tight joint would be effected. In connecting such pipes the first pipe, after rolling, has been riveted along the longitudinal seam and finished. The next pipe to be connected to it, after rolling, has had the end thereof overlapped around one of the ends of the first pipe and this prior to riveting. The lapped unriveted end has then been squeezed around the first pipe by the use of various styles of clamps and when held by the clamps has been riveted to hold the squeezed in edges of the second pipe together and fastened to the first pipe. As far as I am aware the various styles of clamps which have heretofore been used have not given a tight joint, which is desirable, as obviously the tighter the end of one pipe is lapped on the end of the other the more rigid a series of connected pipes will be and better the water joint formed between them. My invention allows one to jam the end of the overlapped pipe particularly tight around the end of the inner pipe and with despatch, and at the same time to rivet and hold the jammed end of the overlapped pipe to the end of the inner pipe.

Referring now to the drawings;

1 represents a riveting machine of any approved form, presenting the horn or stake 2 and the riveter 3. This machine is of ordinary construction and it is not herein considered necessary to further describe it.

In a position located at right angles to the horn I locate my pipe squeezer which is actually a machine in itself, and presents a bed casting 4 having the front end thereof presenting a pair of upstanding spaced foot pieces 5 and 6 connected by an intervening web 7, which foot pieces provide opposing, upper and lower bearings for stub shafts 8 and 9 on which I have mounted rotatably a pair of spaced guides, such as flanged pulleys 10 and 11.

The rear end of the bed casting is suitably fashioned so as to provide a bearing for a steam cylinder 12 of which 13 and 14 are the heads, 15 is the piston and 16 the piston rod extending outwardly from the piston through the head 14.

The forward end of the piston is provided with a more or less U-shaped bracket 17 in which I have rotatably mounted a flanged pulley 18 which is contained in the same plane as that containing the pulleys 10 and 11, and is alined horizontal with the web 7 located midway between the shafts 8 and 9.

Steam is supplied to the cylinder through a flexible connection (not shown) which connects the inlet steam pipe 19. This pipe communicates through the valve 20 with the interior of the cylinder through feed pipes 21 and 22 connecting the valve casing with the opposite ends of the cylinder. The valve is controlled by a lever 23.

The particular manner in which live steam is directed to and exhausted from the cylinder forms no part of this invention, but in order that the whole device may be better understood I have shown one form of controlling valve, the details of which appear best in Fig. 6 of the drawings. Here it will be seen that the valve is provided with a cross port 24 having one end flared as indicated at 24' and is equipped, further, with a cross duct 25 in the nature of a peripheral slot.

The valve casing is fitted with an exhaust opening 26 which is arranged to connect with the duct 25 in the turning of the valve.

From the above it will be seen that in the position which the valve occupies in the drawings, the incoming steam through the pipe 19 will pass directly through the port 24 of the pipe 21 and to the rear end of the cylinder and that the exhaust steam can escape from the head end of the cylinder through the pipe 22, duct 25 and exhaust port 26. Further, that upon the turning of the lever to effect a counter clockwise rotation in the valve, the flaring end of the port 24 can be brought to a position to connect the pipe 19 with the pipe 22 and the pipe 21 with the exhaust port 26, the latter connection being made through the duct 25. The latter position of the lever will then effect the passage of live steam into the head end of the cylinder and will allow the escape of the exhaust steam from the rear end.

It is desirable to have this squeezing machine set up so that it can be moved toward or away from the horn of the riveter, and this can be by way of a track or by an overhead suspension, as desired. In the present application I have shown the bed casting as mounted on trucks 27 which run upon tracks 27'. It will be noted also in the drawings, that I have provided upstanding hangers 28 secured to the bed plate which can be utilized for suspending the machine from overhead.

29 is a chain fitted with a hook 30 so that the ends thereof can be fastened together and provided in its length with an elongated arched link 31. This chain passes around the pulley 18 and forwardly around the inner sides of the pulleys 10 and 11.

The above completes the disclosure of the parts in so far as my invention is concerned, but in order that one may understand it better I will now describe the way in which it is used, assuming that it is desired to connect and tighten the end of the pipe 32 around the end of the pipe 33; it being assumed that the pipe 33 has been fully riveted and that the pipe 32 has been rolled but the seam thereof, indicated at 32', has not been closed.

The pipe 32 is first placed on the horn with the seam or disjointed edges up. The finished pipe 33 is then placed in position with its inner end resting on the horn and contained within the front end of the pipe 32 which is previously spread to admit it. The pipe squeezer is then brought forward to the pipes so that pulleys 10 and 11 are against pipe. The chain is then passed around the lapping ends of pipe and hooked with the elongated link shown in Figs. 4 and 5 on top of the pipe to permit the riveting machine 3 to drive the rivet inside of the elongated link. The attendant then operates the lever of pipe squeezer to effect, through the cylinder the inpulling of the pulley 18.

As the piston moves back the pulley 18 draws the chain tight around the lapped ends of the pipes and owing to the arrangement of the pulleys 10 and 11 effects the tight jamming of the end of the outer pipe around the end of the contained pipe. The arrangement of the parts is such that when the piston has reached the outer end of its stroke the chain is fully taut. After the tightening of the pipes has been effected the attendant operates the riveting machine to connect the pipes, the riveter operating through the elongated link. The rivet actually is passed through the one thickness of the inner pipe and two thicknesses of the outer pipe as the two edges of the outer pipe are lapped at the top in the squeezing operation and the rivet is passed through them.

Once the rivet has been set the chain can be slacked by passing steam into the rear end of the cylinder and the remainder of the pipe on the horn can be riveted lengthwise. One is then ready to resume the squeezing operation for the next pipe.

What I claim as my invention is:—

1. In a pipe squeezer the combination with a fixed riveting stake upon which the end of a riveted pipe and the end of an unriveted pipe lapped on the riveted pipe may be placed, of a continuous chain connection looped around the lapped ends of the pipes, a pair of adjoining guides located adjacent the lapped ends of the pipes and around which the chain is passed and means for pulling the chain passed between the pair of guides to effect the tightening of the looped end of the chain on the lapped ends of the pipes.

2. In a pipe squeezer the combination with a fixed riveting stake upon which the end of a riveted pipe and the end of an unriveted pipe lapped on the riveted pipe may be placed, of a continuous chain connection looped around the lapped ends of the pipes, a pulling connection attached to the chain and means for retaining the chain looper around the pipes in the pulling of the latter connection.

3. In a pipe squeezer the combination with a fixed riveting stake upon which the end of a riveted pipe and the end of an unriveted pipe lapped on the riveted pipe may be placed, of a continuous chain connection looped around the lapped ends of the pipes, a pair of opposing pulleys located adjacent the lapped ends of the pipes and receiving between them a portion of the chain, a steam cylinder supplied with a piston and means for reciprocating the piston, a piston rod extending from the piston and a pulley located at the end of the rod and receiving that portion of the chain passed between the former pulleys.

4. A pipe squeezing machine comprising, a bed casting having one end thereof provided with a pair of adjacent rotatably mounted pulleys, a steam cylinder mounted on the bed casting and provided with a reciprocating piston fitted with an extended piston rod which is directed toward the pulleys, a second pulley mounted on the extending end of the piston rod and a continuous chain having a portion thereof extending between the pair of pulleys and around the single pulley.

5. A pipe squeezing machine comprising, a bed casting having one end thereof provided with a pair of adjacent rotatably mounted pulleys, a steam cylinder mounted on the bed casting and provided with a reciprocating piston fitted with an extended piston rod which is directed toward the pulleys, a second pulley mounted on the extending end of the piston rod and a continuous chain having a portion thereof extending between the pair of pulleys and around the single pulley, said chain being provided in its length with an elongated arched link.

Signed at Saskatoon this 15th day of April 1916.

CECIL HENRY RICHARDSON.

In the presence of—
W. W. ASHLEY,
I. M. FINLAYSON.

Copies of this patent may be obtained for five cents each, by addressing the "Commissioner of Patents, Washington, D. C."